United States Patent
Pouvreau

(10) Patent No.: US 6,438,505 B1
(45) Date of Patent: Aug. 20, 2002

(54) DEVICE FOR MONITORING THE SPEED OF ROTATION OF AN ELECTRIC MOTOR AND CENTRIFUGING APPARATUS EQUIPPED WITH SUCH A DEVICE

(75) Inventor: Michel René Marie Jacques Pouvreau, Pontchateau (FR)

(73) Assignee: Jouan, Saint Herblain (FR)

( * ) Notice: Subject to any disclaimer, the term of this patent is extended or adjusted under 35 U.S.C. 154(b) by 0 days.

(21) Appl. No.: 09/379,115

(22) Filed: Aug. 23, 1999

(30) Foreign Application Priority Data

Aug. 25, 1998 (FR) .................................. 98 10701

(51) Int. Cl.$^7$ .............................................. G01P 3/487
(52) U.S. Cl. ...................................... 702/145; 318/778
(58) Field of Search ................................ 702/145, 142, 702/96, 84; 324/160, 162, 166–168; 73/491–2, 514.02; 318/40, 45, 51, 55, 68, 71, 90, 276, 778–9

(56) References Cited

U.S. PATENT DOCUMENTS

| | | | | |
|---|---|---|---|---|
| 4,049,083 A | * | 9/1977 | Plunkett | 318/231 |
| 4,727,305 A | * | 2/1988 | Muskovac et al. | 318/798 |
| 4,770,065 A | * | 9/1988 | Woyton | 74/866 |
| 4,868,406 A | * | 9/1989 | Glennon et al. | 290/4 |
| 5,076,761 A | * | 12/1991 | Krohn et al. | 417/18 |
| 5,166,582 A | * | 11/1992 | Jaeger et al. | 318/45 |
| 5,202,616 A | * | 4/1993 | Peters et al. | 318/254 |
| 5,446,354 A | * | 8/1995 | Hiruma | 318/439 |
| 5,469,032 A | * | 11/1995 | Otake | 318/439 |
| 5,508,874 A | * | 4/1996 | Williams et al. | 361/92 |
| 5,726,881 A | * | 3/1998 | Inaniwa et al. | 700/79 |
| 5,770,934 A | | 6/1998 | Theile | |
| 5,898,249 A | * | 4/1999 | Boggs, III | 310/105 |
| 5,917,295 A | * | 6/1999 | Mongeau | 318/254 |
| 6,077,051 A | * | 6/2000 | Centers et al. | 417/280 |
| 6,262,550 B1 | * | 7/2001 | Kliman et al. | 318/565 |

FOREIGN PATENT DOCUMENTS

| | | |
|---|---|---|
| DE | 43 31 640 C1 | 9/1993 |
| DE | 43 31 640 | 3/1995 |
| DE | 195 04 032 | 11/1995 |

* cited by examiner

Primary Examiner—Marc S. Hoff
Assistant Examiner—Edward Raymond
(74) Attorney, Agent, or Firm—Larson & Taylor, PLC

(57) ABSTRACT

This device for monitoring the speed of rotation of an electric motor (10) comprises a unit (16) for controlling the speed of rotation of the motor and a speed limitation unit (14) linked to the control unit (16) and including a processor (24) for comparing between at least one monitoring signal (S'; $U_{PWM}$) representative of the speed of rotation of the motor imposed on the latter by the control unit (16) and a threshold value ($V_{MAX}$) corresponding to the maximum value at which the motor (10) is permitted to operate, and a disconnection unit for at least temporarily disconnecting the motor (10) from its supply should the threshold value be exceeded. Prior to each startup of the motor (10), the control unit (16) carries out a phase of testing the correct operation of the speed limitation unit (14) by generating a monitoring signal (S') corresponding to a speed of rotation value greater than the threshold value. clean paragraphs

8 Claims, 2 Drawing Sheets

Figure 1:
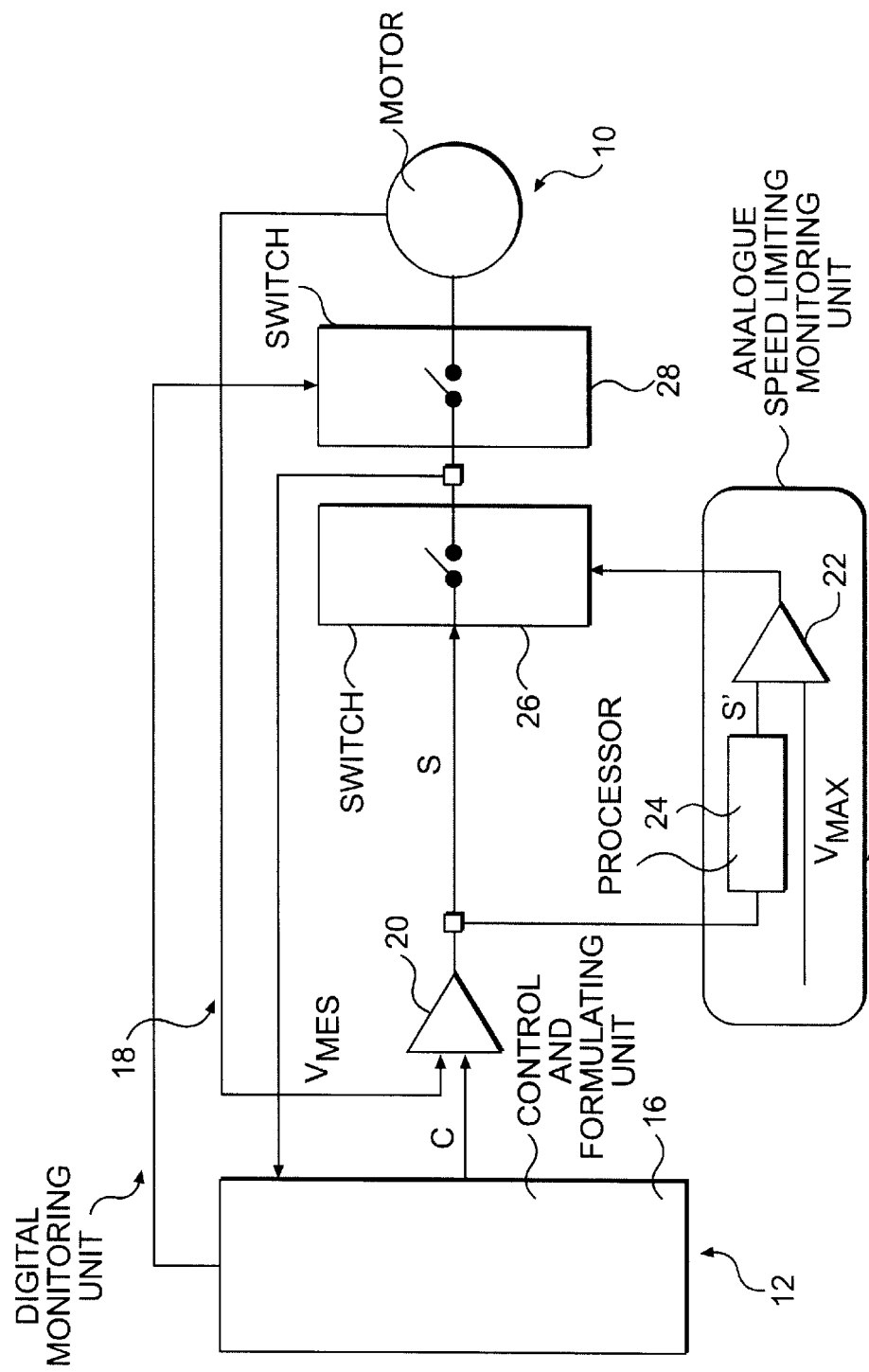

DEVICE FOR MONITORING THE SPEED OF ROTATION OF AN ELECTRIC MOTOR AND CENTRIFUGING APPARATUS EQUIPPED WITH SUCH A DEVICE

The present invention relates to a device for Monitoring the speed of rotation of an electric motor.

It applies in particular to the monitoring of the speed of rotation of the rotor of a centrifuging apparatus so as to prevent the latter from being spun at a speed of rotation above its maximum allowable value.

To improve the reliability of such devices, they are often fitted with redundant monitoring units so as to prevent the failure of one of them from having harmful consequences for the motor.

Thus, there is known from the state of the art, a device for monitoring the speed of rotation of an electric motor, of the type comprising a unit for controlling the speed of rotation of the motor and an analogue speed limitation unit linked to the control unit and including means for comparing between at least one monitoring signal representative of the speed of rotation of the motor imposed on the latter by the control unit and a threshold value corresponding to the maximum speed at which the motor is permitted to operate, and means for at least temporarily disconnecting the motor from its supply should the threshold value be exceeded.

A device of this type therefore makes it possible to prevent the motor from being spun at a speed of rotation above its maximum allowable speed.

The objective of the invention is to provide a monitoring device of this type, which is furthermore capable of preventing the motor from being rotated should the speed limitation unit malfunction.

Its subject is therefore a monitoring device of the aforesaid type, characterized in that prior to each startup of the motor, the control unit carries out a phase of testing the correct operation of the speed limitation unit by generating a drive signal corresponding to a speed of rotation value greater than the threshold value.

The monitoring device according to the invention can furthermore include one or more of the following characteristics, taken in isolation or according to all the technically possible combinations:

- it furthermore includes second means for disconnecting the motor from its supply during the test phase;
- the monitoring signal is formulated from an output signal from a comparator of a speed regulation loop which receives as input a preset signal delivered by the control unit and a measurement signal for the speed of rotation of the motor;
- the control unit is linked to the output of the first means so as to disconnect the motor with a view to detecting the correct operation of the speed limitation unit;
- the control unit consists of a microprocessor-based control unit delivering motor drive signals in the form of pulse width modulation control signals fed to a three-phase electrical energy supply stage for the motor, the said supply stage being supplied from a DC voltage source by way of a variable-impedance stage under the control of the speed limitation unit, and the said at least one monitoring signal is formulated from the drive signals; and
- the variable-impedance stage consists of a filtering stage comprising a resistive element in parallel with which is linked a bypass circuit equipped with a switching element which is opened by the comparison means, should the threshold value be exceeded.

The subject of the invention is also a centrifuging apparatus comprising a rotor driven in rotation by an electric motor, characterized in that it is equipped with a device for monitoring the speed of rotation of the motor as defined above.

Figure 2:
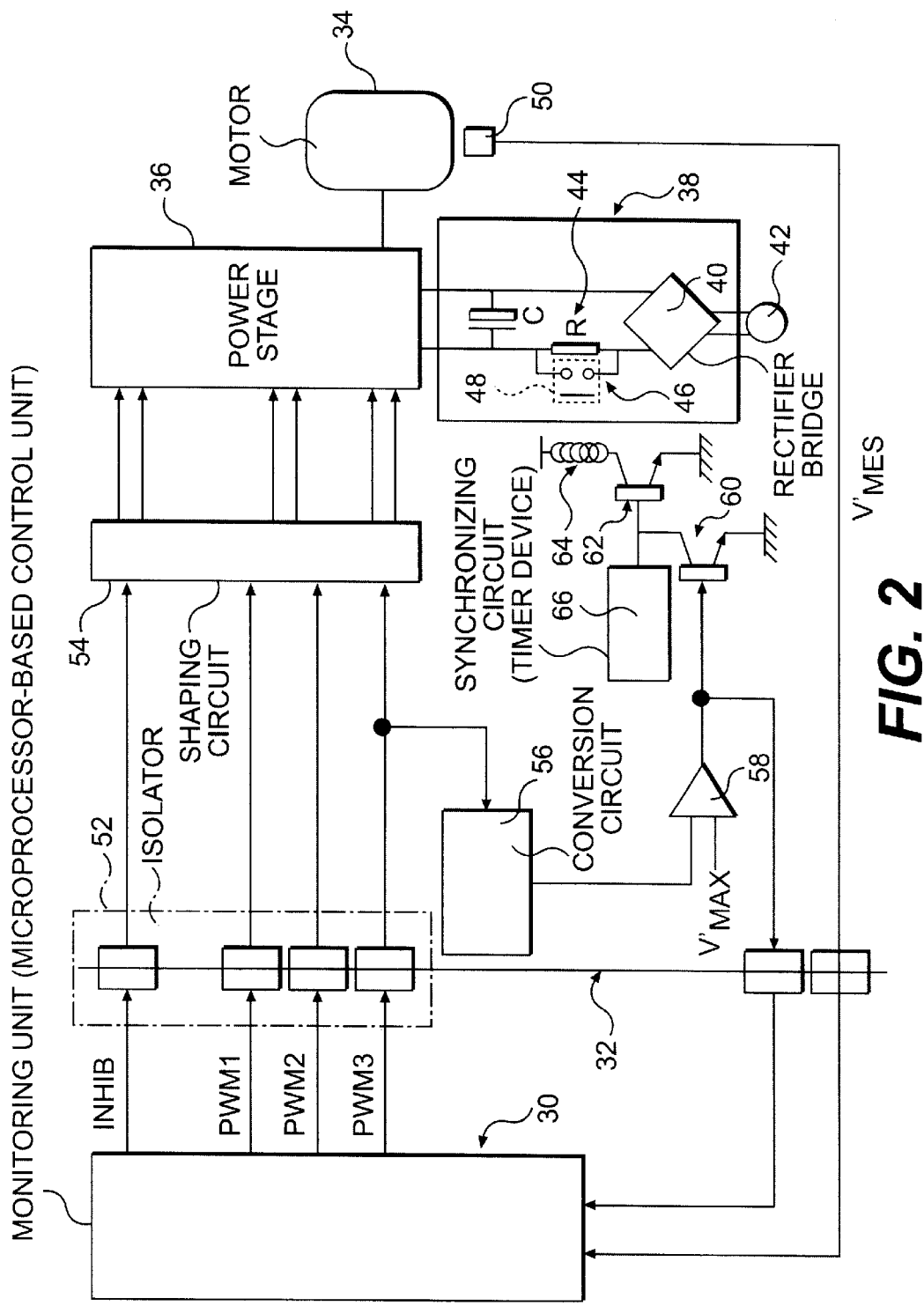

Other characteristics and advantages will become apparent from the following description given merely by way of example and with reference to the appended drawings in which:

FIG. 1 is a schematic diagram of a device for monitoring the speed of rotation of a motor according to a first embodiment; and FIG. 2 is a schematic diagram of a monitoring device in accordance with the invention according to a second embodiment.

Represented in FIG. 1 is a device for monitoring the speed of rotation of a motor 10 driving a rotor (not represented) of a centrifuging apparatus.

The monitoring device comprises two, redundant, monitoring units 12 and 14 making it possible to control the rotation of the motor 10 according to a speed at which it is permitted to be driven.

The first monitoring unit 12 consists of a control unit intended to steer the speed of rotation of the motor to an imposed preset value C.

This monitoring unit 12 comprises, as is conventional, a unit 16 for controlling and formulating the preset value C and a regulating loop 18 which delivers a signal S for driving the motor.

As may be seen in this FIG. 1, the regulating loop 18 comprises a comparator 20 which receives on its inverting terminal the preset signal C and on its non-inverting terminal a signal $V_{MES}$ for measuring the actual speed of rotation of the motor.

The second monitoring unit 14 consists of a speed limitation unit adapted so as to prevent the latter from reaching a maximum allowable value $V_{MAX}$ in respect of the motor.

The monitoring units 12 and 14 are made from components employing different technologies.

Thus, while the first monitoring unit 12 consists of a processor, made from digital components, the second monitoring unit 14 is made from analogue components so as to prevent malfunctions from occurring simultaneously in both monitoring units.

Furthermore, the use of analogue components allows a substantial reduction in the cost of the monitoring device.

As may be seen in this FIG. 1, the speed limitation unit 14 comprises a comparator 22 which makes a comparison between a signal S' representative of the speed imposed on the motor by the control unit 12 and the threshold value $V_{MAX}$.

The signal S' is formulated from the drive signal S by processing means 24 linked to the output of the comparator 20 of the control unit 12 and adapted so as to convert the motor drive signal S into a signal corresponding to the speed imposed thereon.

The output of the comparator 22 of the speed limitation unit 14 is linked to a switch 26 so as to disconnect the motor 10 from its supply, that is to say to disconnect it from the control unit 12, as soon as the signal S' is greater than the threshold value $V_{MAX}$.

Moreover, a second switch 28 is linked between the first switch 26 and the motor 10.

This second switch 28 is operated by the control unit 16 so as to disconnect the motor from its supply during a phase of testing the correct operation of the speed limitation unit 14, which takes place each time the motor is started up.

Lastly, in FIG. 1 it may be seen that the output, located on the motor 10 side, of the first switch 26 is linked to the control unit 16 so as to feed the latter with an indication relating to the state of the switch 26.

During each phase of testing the operation of the speed limitation unit 14, which, as mentioned above, takes place before each cycle for operating the motor 10, the control unit 16 generates a preset signal C corresponding to a speed value above the threshold value $V_{MAX}$, thereby causing the opening of the first switch 26.

This opening, detected by the control unit 16, attests to the correct operation of the speed limitation unit 14.

In this case, the motor 10 can be set into operation.

It will be noted that during this prior test phase, the control unit 16 will cause the second switch 28 to open so that the motor 10 is prevented from rotating.

It is therefore appreciated that on account of this test phase it is always possible, before setting the motor 10 into operation, to check for the correct operation of the speed limitation unit 14 and to do so without having to rotate the motor.

With reference to FIG. 2, another embodiment of the monitoring device in accordance with the invention will now be described.

As in the embodiment described with reference to FIG. 1, this device comprises two redundant monitoring units, respectively labelled with the numerical references 30 and 32, the one, 30, consisting of a microprocessor-based control unit which delivers drive signals for the motor 34, PWM1, PWM2 and PWM3 in the form of pulse width modulation (PWM) control signals. These drive signals are fed to a supply stage 36 consisting of the association of three power modules each consisting of switching cells based, for example, on insulated-gate bipolar transistors (IGBTs).

Balanced three-phase electrical energy which can vary in voltage and frequency is delivered to the motor 34 by the power stage 36, the latter constituting an inverter circuit.

It is supplied with DC voltage by a voltage source 38 comprising a diode rectifier bridge 40 supplied with AC voltage from the mains, represented diagrammatically and labelled with the reference 42, and a filtering circuit 44 consisting of the association of a resistor R and a capacitor C.

As may be seen in this FIG. 2, a bypass circuit 46 is wired in parallel with the resistor R and includes a switching element 48 positioned in the closed state when the device is operating normally.

It is therefore appreciated that the filtering circuit 44 constitutes a variable-impedance stage dependent on the state of the switching element 48.

Moreover, a tachometer 50 measures the speed of rotation of the motor 34 and feeds the measured value $V'_{MES}$ to the control unit 30 which, in response, alters the drive signals PWM1, PWM2 and PWM3 in such a way as to steer the speed of rotation of the motor 34 to a predetermined value imposed by the control unit 30.

As may be seen in FIG. 2, the drive signals PWM1, PWM2 and PWM3 are fed to the power stage 36 by isolating means 52 based for example on optical transistors, and by way of a suitable shaping circuit 54.

The speed limitation unit 32 is linked, at input, between the isolating means 52 and the shaping circuit 54, to at least one drive line for the power stage, conveying the drive signals.

In this figure, the speed limitation unit 32 is regarded as being linked to a single drive line, but of course, as a variant, it can tap off information concerning the speed of the motor from two drive signals.

A conversion circuit 56 converts the motor control frequency conveyed by the drive signals into a monitoring voltage $U_{PWM}$ corresponding to the value of the speed of rotation imposed on the motor 34.

It is linked, at output, to a comparator 58 which compares the voltage $U_{PWM}$ delivered by the conversion circuit 56 with a threshold value $V'_{MAX}$ corresponding to the maximum allowable value in respect of the motor 34.

The output of the comparator 58 drives the base of a transistor 60 operating in a switching regime in such a way as to turn on the transistor as soon as the value of the voltage $U_{PWM}$ delivered by the conversion circuit 56 exceeds the threshold value $V'_{MAX}$.

The transistor 60 drives the base of a second transistor 62, also operating in a switching regime and to the collector of which is linked a relay 64 for operating the switch 48 mentioned above.

Moreover, a timer device 66 is also linked to the base of the second transistor 62 so as to turn the latter on for a predetermined period of time, as will be described below.

Finally, in FIG. 2 it may be seen that the base of the first transistor 60, linked to the output of the comparator 58, is also connected to the control unit 30 and that the latter feeds a signal INHIB to the shaping circuit 54 so as to disable the drive signals when this signal INHIB is high.

The device just described operates as follows.

As in the case of the embodiment described earlier with reference to FIG. 1, before each cycle for setting the motor 34 into operation, the device carries out a phase of testing the correct operation of the speed limitation unit 32.

To do this, the control unit 30 sets the signal INHIB high so as to prevent the motor 34 from being rotated and generates drive signals PWM1, PWM2 and PWM3 corresponding to a speed of rotation of the motor 34 greater than its maximum allowable speed.

Thereupon, the output from the comparator 58 goes high, thus causing the switching element 48 to open and the supply to the motor 34 to be cut off insofar as the electrical energy is absorbed by the resistor R.

As soon as the control unit 30 detects that the output from the comparator 58 has gone high, this unit permits the motor 34 to be started up.

Finally, it will be noted that on powering-up the device, the synchronizing circuit 66 causes the switch 48 to open momentarily so as to limit the current charging the capacitor C.

I claim:

1. A device for monitoring the speed of rotation of an electric motor, said device comprising a control unit for controlling the speed of rotation of the motor and a speed limitation unit, the control unit comprising generating means for generating at least one control signal for controlling the speed of rotation of the rotor, the speed limitation unit being linked to the control unit and including means for comparing at least one monitoring representative of the speed of rotation of the motor imposed on the latter by the control unit through the at least one control signal and a threshold value corresponding to the maximum value at which the motor is permitted to operate, the device further comprising first disconnecting means for at least temporarily disconnecting the motor from its supply should the threshold value be exceeded, characterized in that prior to each startup of the motor, the control unit carries out a test phase for testing the correct operation of the speed limitation unit in which test phase the generating means generates at least one control signal corresponding to a speed of rotation value greater than the threshold value.

2. A device according to claim 1, wherein the device further includes second disconnecting means for disconnecting the motor from its supply during the test phase.

3. A device according to claim 1, wherein the monitoring signal is formulated from an output signal from a comparator of a speed regulation loop which receives as input a control signal and a measurement signal related to the speed of rotation of the motor.

4. A device according to claim 3, wherein the control unit is linked to the output of the first disconnecting means so as to detect the disconnection of the motor by the first disconnecting means.

5. A device according to claim 1, wherein the control unit comprises a microprocessor-based control unit delivering control signals in the form of pulse width modulation control signals fed to a three-phase electrical energy supply stage for the motor, said supply stage being supplied from a DC voltage source by way of a variable-impedance stage under the control of the speed limitation unit, and wherein the said at least one monitoring signal is formulated from at least one control signal.

6. A device according to claim 5, wherein the variable-impedance stage comprises a filtering stage comprising a resistive element in parallel with which is linked a bypass circuit equipped with a switching element which is opened by the comparison means whenever the threshold value is exceeded.

7. A device according to claim 1, wherein the speed limitation unit comprises an analogue speed limitation unit.

8. Centrifuging apparatus comprising a rotor driven in rotation by an electric motor, characterized in that the apparatus is equipped with a device for monitoring the speed of rotation of the motor according to claim 1.

* * * * *